United States Patent

Smith

[15] 3,638,430
[45] Feb. 1, 1972

[54] HIGH-STRENGTH FIRE-RESISTANT SPILL CONTROL BOOMS

[72] Inventor: Millard F. Smith, P.O. Box 295, Saugatuck, Conn. 06882

[22] Filed: Apr. 14, 1969

[21] Appl. No.: 815,663

[52] U.S. Cl. .................................................61/1 F, 61/5
[51] Int. Cl. ......................................................E02b 15/04
[58] Field of Search ..........................61/1, 1 F, 5; 160/264

[56] References Cited

UNITED STATES PATENTS

| | | | |
|---|---|---|---|
| 2,200,552 | 5/1940 | Mook | 61/1 F |
| 3,146,598 | 9/1964 | Smith | 61/1 F |
| 3,161,258 | 12/1964 | Chapman | 160/264 X |
| 3,184,923 | 5/1965 | Galvaine | 61/1 F |

FOREIGN PATENTS OR APPLICATIONS 945,091   12/1963   Great Britain..........................61/1 F

*Primary Examiner*—Peter M. Caun
*Attorney*—Robert H. Ware

[57] ABSTRACT

Rugged high-strength fire-resistant floating booms, each incorporating a continuous flexible fin suspended at and extending below the surface of a body of water, supported by short floats formed of highly fire-resistant material, such as foamed aluminum blocks, spaced apart longitudinally along the upper edge of the fin to permit flexing and accordion folding of the structure and to provide flexible articulating movement with surface waves; all parts of each spill control boom being formed of highly fire-resistant and high-strength materials substantially impervious to impact, bending or snagging between vessels, docks, pilings and similar structures, and optionally incorporating resilient fender materials protecting the hulls of adjacent vessels and barges as well as docks and pilings from impact damage, while retaining spilled petroleum products or other floating materials discharged from a dockside vessel in the immediate vicinity of the spill, and preventing the movement of such spilled material under docks and other structures.

9 Claims, 10 Drawing Figures

PATENTED FEB 1 1972

INVENTOR.
MILLARD F. SMITH
BY Robert H. Ware
MATTERN WARE & DAVIS
ATTORNEYS

3,638,430

HIGH-STRENGTH FIRE-RESISTANT SPILL CONTROL BOOMS

BACKGROUND OF THE INVENTION

Increasingly high-volume shipments of crude oil and refined petroleum products, such as gasoline and jet engine fuel, by waterborne vessels and barges has created increasing risk of serious damage to shore installations from petroleum spills discharged from ruptured hoses or damaged vessels. The spill control booms described in my U.S. Pat. No. 3,146,598 and in my copending U.S. Pat. application, Ser. No. 739,452, filed June 24, 1968, are lightweight floating booms each incorporating a continuous elongated flexible polymer fin suspended from foamed polymer floats. The extremely light weight of these floating polymer booms provides maximum convenience in transportation, storage and deployment of such booms for quickly surrounding the spilled floating material in order to contain it near its point of origin.

In addition to harbor pollution dangers, a petroleum spill discharged from a dockside vessel creates serious additional risk of fire which may damage or destroy the dock and nearby shore installations. When spilled petroleum products and particularly gasoline are released from a dockside vessel, they spread rapidly toward and under all nearby docks and other structures and surround other nearby vessels.

The devices of the present invention are high-strength fire-resistant floating barriers, which are positioned between the dockside vessel and the adjacent installations or vessels to be protected. For example, they may be deployed alongside the vessel, between the landward side of the vessel's hull and the adjacent dock. These fire-resistant floating booms may be anchored permanently in this position at dockside, ready to protect the dock and all nearby shore installations against risks of fire from an unexpected spill.

OBJECTS OF THE INVENTION

Accordingly, a principal object of the invention is to provide high-strength fire-resistant floating barriers for the control of floating spilled materials.

Another object of the invention is to provide such structures affording convenient cooperation with docks standing on pilings as well as with jetties, piers and similar structures.

A further object of the invention is to provide such spill control booms having the capability for bending and flexing both laterally and vertically in their deployed position to conform to the shapes of vessels and shore structures and also to conform to surface waves.

Another object of the invention is to provide such spill control booms having the capability for flexing and accordion folding for storage.

A further object is to provide floating spill control booms suitable for use in drainage, boundary and barrier streams passing through or around refineries and hydrocarbon tank farms.

Other and more specific objects will be apparent from the features, elements, combinations and operating procedures disclosed in the following detailed description and shown in the drawings.

THE DRAWINGS

Figure 1:
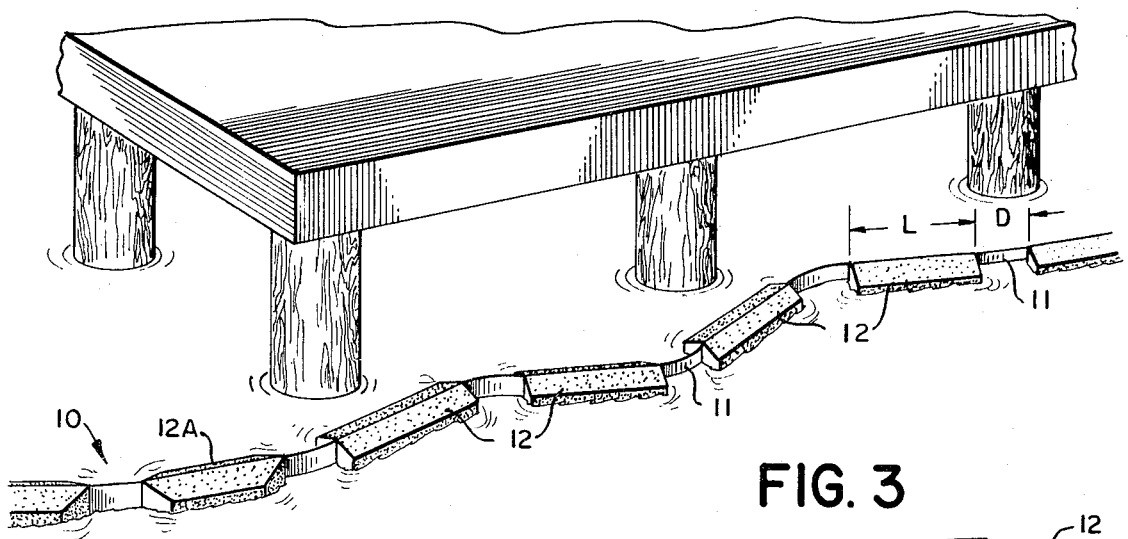
FIG. 1 is a fragmentary perspective view of a spill control boom incorporating the features of the present invention deployed in the water beside a dock.

The high-strength fire-resistant booms of the present invention are typified by the boom 10 shown in FIG. 1. They each incorporate a continuous, flat, relatively flexible fin 11 forming a fence or curtain positioned vertically with a major portion of its vertical height submerged under water, and a small upper portion of its height retained above water. The fin is supported by a series of floats 12 secured along its upper exposed edge. Both the fin 11 and the floats 12 are formed of highly fire-resistant materials, preferably capable of withstanding temperatures of up to 1,000° F. for periods as long as 1 hour, in order to provide ample time for the spreading of foam or the release of carbon dioxide or similar fire suffocating agents to cover any flammable floating gasoline, petroleum products or the like spilled adjacent to the spill control boom 10.

Figure 7:
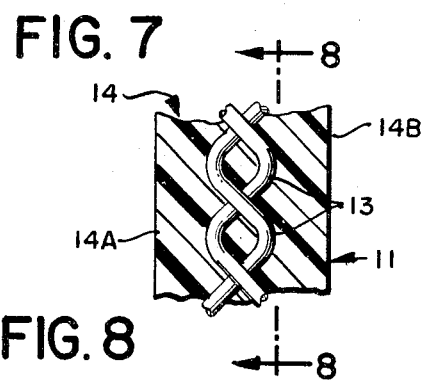
FIG. 7 is a greatly enlarged fragmentary cross-sectional end elevation view of the continuous, reinforced fin of a spill control boom embodying the present invention.
Figure 8:
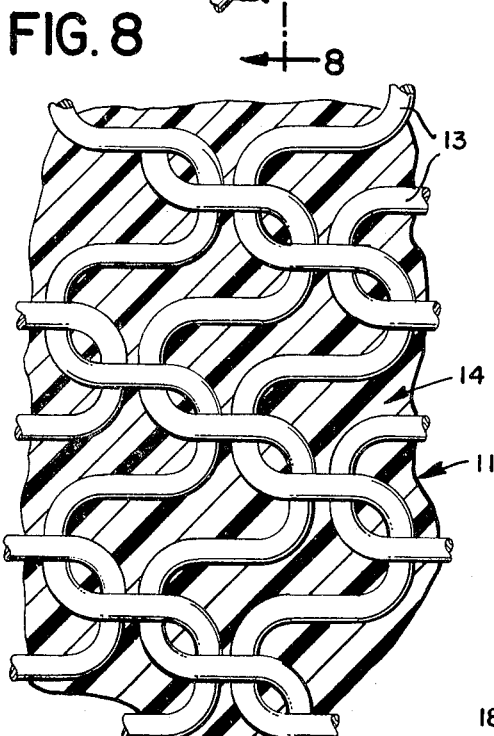
FIG. 8 is a greatly enlarged fragmentary side cross-sectional elevation view of the same continuous fin and reinforcing wire structure incorporated therein.

Fin 11 is preferably fabricated of a "knitted" wire mesh 13 centrally enclosed between outer layers 14 of flexible elastomer materials having high heat-resisting characteristics. For example, the knitted wire mesh 13 shown in the greatly enlarged views of FIGS. 7 and 8 forms a somewhat stiff but semiflexible core supporting on one face or on both faces a continuous outer covering layer 14 which may be formed of such material as neoprene elastomer filled with silicone filling agents to increase its heat resistance.

Various polyamide materials having high heat-resistant properties may also be employed to form each outer layer 14 supporting embedded in one face thereof, or encapsulating and enclosing therebetween, the flexible knitted metallic wire mesh 13. Other alternative materials from which the continuous flexible fin 11 may be formed include Union Carbide "Thermanol" woven carbon filament fabric; asbestos fabrics bonded with neoprene layers 14; and glass fiber fabrics similarly bonded with neoprene layers 14. However, neoprene laminates have exhibited some tendency to swell and delaminate from supported fabrics unless laminated edges are thoroughly sealed during fabrication.

The knitted mesh core 13 may also be formed of high-temperature nylon fibers. In all of these cases the high-temperature resistant layers 14 applied to either or to both sides of the knitted mesh core preferably extend through the interstices in the core 13 to form an integrally bonded structure with the layer 14 on one side or on both sides of the mesh core being interlocked therethrough to become a single encapsulating matrix for the core 13. In this manner, a single-supporting layer 14A (FIG. 7) may have mesh core 13 embedded in one face thereof; or two facing layers 14A and 14B may intrude and meld together through the interstices of mesh core 13 to form an integral, flexible sandwich fin structure.

Figure 10:
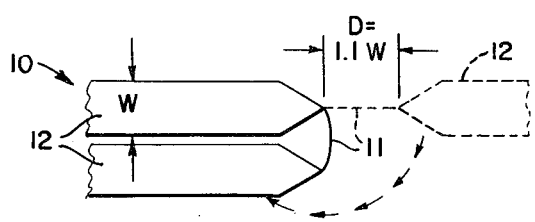
FIG. 10 is a fragmentary schematic plan view of two adjacent floats and the intervening fin, showing the accordion-folding capability of the booms of this invention.

As shown in FIG. 1, the fin 11 formed of a fabric or knitted metallic mesh 13 encapsulated in high-temperature resistant layers 14 is sufficiently flexible to permit lateral bending and flexing between the floats 12, which are spaced apart sufficiently to permit the boom 10 to be accordion folded back upon itself at any desired space between adjacent floats 12. Accordingly, each float is spaced lengthwise along fin 11 from its next adjacent float 12 by a distance at least equal to the lateral width or thickness from side to side of the floats 12 as shown in FIG. 10. Spacing between floats of 1.1 W, or 1.1 times the lateral width W of floats 12, provides sufficient intervening length of the flexible fin 11 to permit 180° accordion folding of the boom 10 for convenient storage and shipping, for example.

Figure 3:
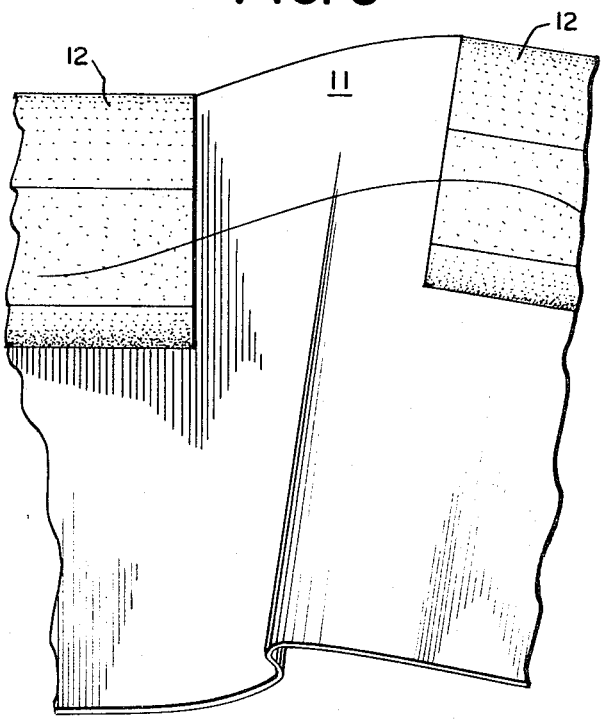
FIG. 3 is a fragmentary enlarged side elevation view of the same boom, illustrating a zone of vertical flexing between the floats thereof.

The floats 12 may be formed in any convenient length, and float lengths between 12 and 18 inches have been found to provide excellent conformity with vertical crests and troughs of surface waves, allowing the boom 10 to flex vertically as well as laterally while performing its spill control functions without interruption, as shown in FIG. 3. The continuous fin 11 having a core of knitted metallic mesh 13 is well adapted to permit such vertical and lateral flexing at points between adjacent floats 12, where the boom 10 easily adjusts itself to differences in the vertical height of the water surface formed by advancing troughs and crests of surface waves.

The maximum distance D between floats 12 is preferably two-thirds or less of the normal diameter of piles or supporting vertical members beside which boom 10 is normally deployed to minimize the risks of snagging the boom between adjacent floats 12 on such pilings or similar structures. As a further precaution against snagging floats 12 on such pilings, the floats may be provided with tapered ends formed by sharply raked end surfaces of the float blocks as shown on floats 12A illustrated at the left end of boom 10 in FIG. 1.

Figure 9:
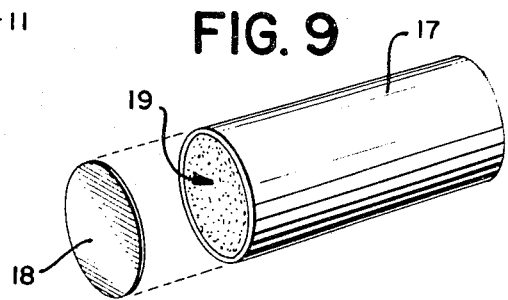
FIG. 9 is an exploded perspective view of a composite supporting float structure employed in a further-modified embodiment of the invention.

Floats 12 are preferably made of highly temperature-resistant material, such as foamed aluminum blocks having a closed cell foam structure, and are secured to the fin 11 by any convenient means such as straps, rivets, bolts, adhesives or the like. In place of foamed aluminum blocks, blocks of other foamed metals, ceramics and high temperature-resistant compounds may be employed as floats 12. Alternatively, as shown in FIG. 9, a drawn metallic can 17 sealed by an end cap 18 and enclosing lightweight polymer foam material 19 forms a composite float structure whose buoyancy is contributed by the polymer foam while the enclosing sealed can protects the polymer foam from heat. Thus, floats 12 are provided with heat-resistant outer surfaces—the exposed surfaces of each metallic can 17 and each cap 18, or the outer surfaces of foamed metallic or ceramic blocks 12.

Alternative materials for the fabrication of high temperature-resistant floats 12 include modified polyvinyl chloride cellular foam, which bubbles and chars when exposed to heat, forming a refoamed cellular "ablative char" material of lower density and greater porosity than the original virgin foam. In this respect, these PVC foam materials are comparable to the ablator materials, such as phenolic carbon and phenolic graphite, formed of carbon powder and graphite cloth and fabric impregnated with phenolic resin curing agents, and employed in the refractory ablation firing nozzle throats of large rocket motors where they form ablative chars of reduced density when exposed to rocket motor exhaust gases at temperatures ranging up to 4,500° F.

Another alternative structure for floats 12 employs a highly fire-resistant neoprene-supported fabric forming the sheath 17 of FIG. 9, enclosing less heat-resistant polymer foam 19, for example. When exposed to high temperatures, these neoprene-supported fabric sheaths char to form a hard, rigid shell which insulates the foam enclosed therein from external heat. Since the underside of floats 12 is immersed in sea water, polymer foams 19 insulated in this manner by a hard protective shell 17 are normally melted only partially by hydrocarbon spill fire temperatures, retaining ample cellular buoyancy to maintain the boom 10 afloat until fire-suffocating gas or chemicals can be applied to the spilled hydrocarbons. Cool water temperatures normally prevent the fusing of foams 19 below the waterline, maintaining buoyant volume A (FIG. 4) supporting even a fire-charred boom.

In practice, the rapid evaporation of spilled gasoline floating on the water surface adjacent to the enclosing boom withdraws the heat of vaporization of the gasoline to provide evaporative chilling of the evaporation zone, serving to minimize the temperatures to which the boom is exposed.

Thus, even fire-charred booms of this invention retain sufficient buoyancy to remain afloat and contain spilled oil during initial spill emergency conditions until other protective measures can be taken.

If desired, a sturdy wire rope cable 22 may be secured to the boom at spaced intervals, as by clamping clips 23 riveted to fin 11 (FIG. 5), to provide added tensile strength resisting stresses imposed by towing, wind, current and shock and impact loads imposed by service conditions in the field. Cable 22 and wire mesh core 13 thus form mutually supplementing flexible metallic tension-resisting reinforcing means anchored to the fin 11 in load-distributing relationship, preferably extending along the entire length of fin 11 and supplying the requisite tensile load-carrying capacity without impairing the fire-resistant qualities and the free flexing wave-conforming and accordion-folding characteristics of these structures. If desired, either the mesh core 13 or the cable 22 may be omitted, but one or the other is ordinarily desirable to assure sufficient tensile strength for normal heavy-duty use.

Figure 4:
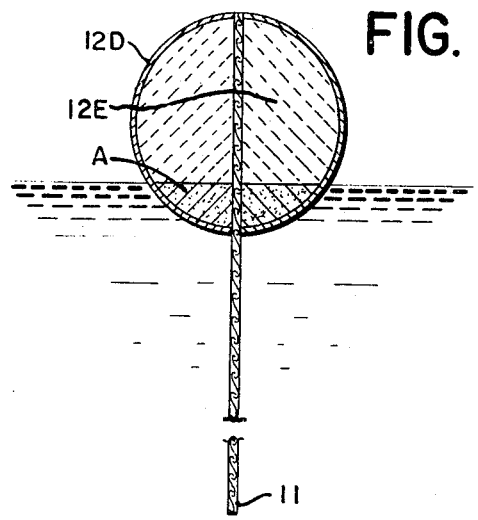
FIGS. 4 and 5 are cross-sectional end elevation views of alternative embodiments of the present invention showing different shapes of floats, with optional resilient fenders being incorporated in the embodiment of FIG. 5.
Figure 5:
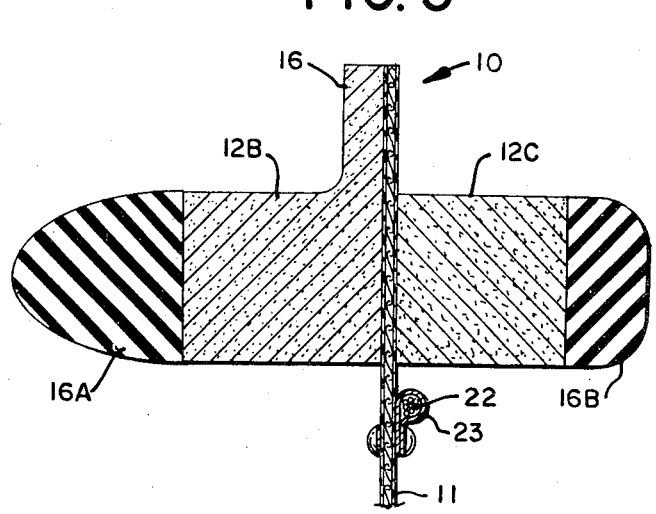
Figure 6:
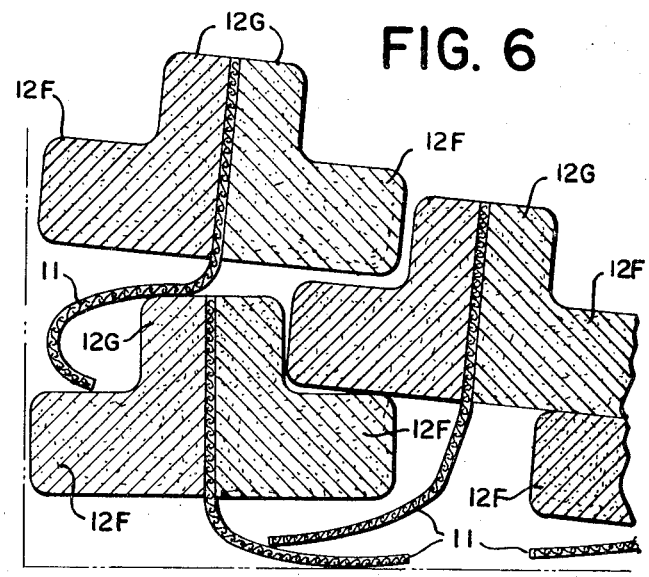
FIG. 6 is a cross-sectional end elevation view of a corner of a storage container enclosing numerous juxtaposed floats of a single accordion-folded spill control boom exemplifying a further modified embodiment of the present invention.

The cross-sectional float configurations illustrated in FIGS. 4, 5 and 6 are alternative forms of float blocks which may be employed in the booms of this invention. An upstanding barrier 16 is formed on the fin-adjoining side edge of the left float 12B in FIG. 5, forming an upstanding ridge support for the upper edge of fin 11 high enough above the water surface to prevent splashing or spattering of spilled floating petroleum products from the exposed side of the boom 10 facing the vessel to the opposite, protected side of the boom facing the dock.

Optional resilient fender materials are shown mounted on the lateral edge surfaces of the floats 12B and 12C in FIG. 5. These fender materials preferably extend along the exposed outer side edges of each float 12, and are preferably formed of flexible, heat-resistant materials such as neoprene foam. They may be formed as thick flexible fender strips 16A shown mounted on the outer edge face of float 12B in FIG. 5, or they may be formed as narrower resilient fender strips 16B shown secured along the outer edge of the corresponding float block 12C in FIG. 5.

Float blocks having semicircular cross sections, such as the float blocks 12D and 12E shown in FIG. 4, may be combined back-to-back with fin 11 secured between their facing surfaces to form an embodiment of the present invention somewhat resembling in cross-sectional figuration the polymer oil booms of my U.S. Pat. No. 3,146,598, but the high-temperature characteristics and fire-resistant qualities, coupled with the high-strength, impact-resistant advantages of the spill control booms of the present invention allow them to be deployed lengthwise extending between docks and barges, where tremendous crushing forces are applied by onshore winds, driving vessels against lee shore docks, without risk of damage to the docks or vessels or to the booms 10 and without danger of loss of their spill control capability.

Figure 2:
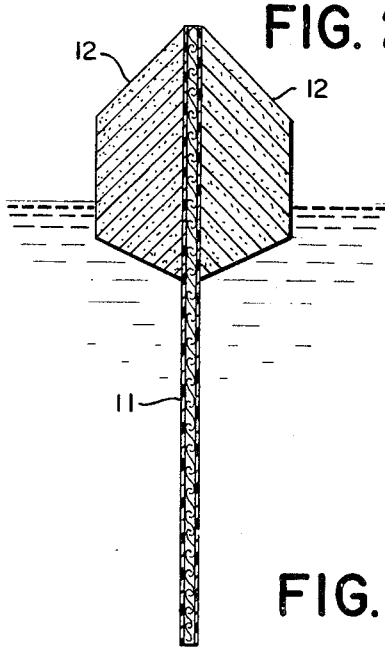
FIG. 2 is an enlarged cross-sectional end elevation view of the spill control boom shown in FIG. 1.

Irregularly shaped float structures, such as the inverted T-shaped or "hat"-shaped float cross sections illustrated in FIG. 6, may be selected to nest one with the other in successive layers of floats as the booms 10 are accordion-folded in storage containers. In the boom illustrated in FIG. 6, the floats are formed as blocks of buoyant high temperature-resistant materials such as foamed aluminum having L-shaped cross sections incorporating a wide hull portion 12F surmounted by an upstanding ridge portion 12G. These L-section float blocks are preferably secured back-to-back, sandwiching the fin 11 therebetween. In this manner, the ridge portions 12G form an upstanding central ridge structure corresponding generally to the combination of the ridge barrier 16 and the fin 11 secured thereto in the embodiment shown in FIG. 5. In the embodiment of FIGS. 1, 2 and 3, the float blocks 12 are trapezoidal in cross section, as can be seen best in FIG. 2, with their widest surfaces back-to-back, sandiching the fin 11 therebetween, and thus forming an upstanding central ridge substantially aligned with the upper edge of the fin 11 to form a barrier of uniform height above the water surface in order to retard splashing or slopping of retained floating material from one side of the boom to the other.

Since windage on these upstanding ridges displaces the boom to leeward and adds longitudinal tension tending to displace its terminal anchors, the value of the ridge must be weighed against the disadvantage of its windage, and some compromise is essential in choosing dimensions for these devices.

As seen in FIG. 6, the inverted T cross sections of the float portions of the booms there shown are well adapted to nest vertically, with the hull portions 12F of floats previously laid into the storage container 21 nestled between the upstanding ridge portions 12G of floats previously flaked side by side.

When foamed aluminum block floats are employed with stainless steel knitted wire mesh reinforced, silicone-filled neoprene fins 11 to form the structures of the spill control booms 10 of the present invention, the fire-resistant capabilities of these structures amply satisfy the preferred requirement of sustaining 1,000° F. temperatures for periods of 1 hour or more.

While the objects of the invention are efficiently achieved by the preferred forms of the invention described in the foregoing specification, the invention also includes changes and variations falling within and between the definitions of the following claims.

What is claimed is:

1. A flexible high-strength heat-resistant unitary floating barrier suitable for deployment between a dock and a vessel comprising:
   A. a continuous, flexible liquid-impervious solid elastomer barrier fin;
      1. having elongated upper and lower edges extending over the length of the boom, and
      2. having a knitted reinforcing and tensile load-distributing mesh interengaging said solid elastomer barrier fin and embedded therein, and
   B. buoyant float blocks having heat-resistant liquid-impervious outer surfaces, anchored at spaced accordion-foldable intervals along the upper edge of the flexible fin for convenient accordion-folding between said floats;
   C. said float blocks having upwardly extending ridge portions secured to the upper edge of the fin and surmounting laterally protruding hull float portions thereof and forming therewith concave, float-receiving longitudinally extending flaking embrasures above the laterally protruding hull float portions and beside the ridge portions of the boom, whereby the accordion-foldable boom is adapted for compactly flaked storage and for high-speed unfolding deployment from storage containers.

2. The barrier boom defined in claim 1 wherein the float blocks are formed of heat-resistant metallic foam material.

3. The barrier boom defined in claim 1 wherein the metallic reinforcing means includes a metal cable anchored to the fin at a large plurality of points spaced apart lengthwise along the boom.

4. The barrier boom defined in claim 1 wherein the reinforcing mesh includes a knitted metallic wire mesh embedded in the continuous flexible barrier fin.

5. The barrier boom defined in claim 4 wherein the knitted mesh is embedded in one side surface of the fin.

6. The barrier boom defined in claim 4 wherein the knitted mesh is centrally embedded and encased within the body of the continuous flexible solid elastomer barrier fin.

7. The barrier boom defined in claim 1 wherein the continuous fin incorporates a temperature-resistant flexible fabric supported by at least one layer of said temperature-resistant elastomer.

8. The barrier boom defined in claim 1 incorporating float blocks whose end surfaces are raked at acute angles measured from their central fin plane, minimizing snagging of boom float blocks on adjacent objects.

9. The barrier boom defined in claim 1 incorporating resilient fender means anchored to the float blocks and projecting in laterally exposed relationship in a direction substantially perpendicular to the barrier fin.

* * * * *